United States Patent
Colebank et al.

(10) Patent No.: US 8,792,818 B1
(45) Date of Patent: Jul. 29, 2014

(54) AUDIO BOOK EDITING METHOD AND APPARATUS PROVIDING THE INTEGRATION OF IMAGES INTO THE TEXT

(76) Inventors: Allen Colebank, Old Saybrook, CT (US); Kevin Colebank, Old Saybrook, CT (US)

( * ) Notice: Subject to any disclaimer, the term of this patent is extended or adjusted under 35 U.S.C. 154(b) by 880 days.

(21) Appl. No.: 12/691,399

(22) Filed: Jan. 21, 2010
(Under 37 CFR 1.47)

(51) Int. Cl.
*G09B 5/00* (2006.01)

(52) U.S. Cl.
USPC ........... 434/317; 704/260; 704/270; 704/275; 700/94

(58) Field of Classification Search
USPC .............. 704/260, 270, 275; 700/94; 434/317
See application file for complete search history.

(56) References Cited

U.S. PATENT DOCUMENTS

| | | | | |
|---|---|---|---|---|
| 5,875,448 A * | 2/1999 | Boys et al. | | 715/201 |
| 6,064,961 A * | 5/2000 | Hanson | | 704/260 |
| 6,081,780 A * | 6/2000 | Lumelsky | | 704/260 |
| 6,633,741 B1 * | 10/2003 | Posa et al. | | 434/317 |
| 6,728,546 B1 * | 4/2004 | Peterson et al. | | 455/462 |
| 7,103,848 B2 * | 9/2006 | Barsness et al. | | 715/776 |
| 7,107,533 B2 * | 9/2006 | Duncan et al. | | 715/727 |
| 7,246,118 B2 * | 7/2007 | Chastain et al. | | 1/1 |
| 7,490,040 B2 * | 2/2009 | Pickering | | 704/260 |
| 8,346,557 B2 * | 1/2013 | Kurzweil et al. | | 704/260 |
| 2002/0099552 A1 * | 7/2002 | Rubin et al. | | 704/270 |
| 2002/0184189 A1 * | 12/2002 | Hay et al. | | 707/1 |
| 2003/0018663 A1 * | 1/2003 | Cornette et al. | | 707/500.1 |
| 2006/0075347 A1 * | 4/2006 | Rehm | | 715/727 |
| 2007/0088712 A1 * | 4/2007 | Watson et al. | | 707/10 |
| 2010/0333015 A1 * | 12/2010 | Nielsen et al. | | 715/784 |
| 2011/0093103 A1 * | 4/2011 | Chuang et al. | | 700/94 |

* cited by examiner

*Primary Examiner* — Shaun Roberts
(74) *Attorney, Agent, or Firm* — Gable Gotwals

(57) ABSTRACT

A method and apparatus for recording and editing audio books which indexes the text and audio recording to one another. This allows for ease in locating a portion of the audio recording corresponding to a portion of text. The audio portion can then be edited. Images can be integrated into the text. These images can be included in the completed file for multimedia presentation. The indexing can also be used for ease in placing various takes in the correct sequential order in the master recording. The original audio recording is maintained unchanged while, changes from editing are contained in a separate file. The method and apparatus can also be used to generate compressed audio and text files for ease of forwarding via e-mail.

14 Claims, No Drawings

AUDIO BOOK EDITING METHOD AND APPARATUS PROVIDING THE INTEGRATION OF IMAGES INTO THE TEXT

1. FIELD OF THE INVENTION

The present invention relates generally to a method and apparatus for recording and editing audio books.

2. BACKGROUND OF THE INVENTION

With the advent of MP3 players the popularity of audio books has taken off. Early audio books were limited in length to the cassettes or compact discs on which they were recorded. However, with MP3 players and other personal electronic devices that play various types of audio computer files the length of the recording rarely presents a limit on the work.

Images can help tremendously in providing information to a book reader. One shortcoming of the audio book format is that it lacks the ability of displaying images. These images could vary from maps, graphs and diagrams to drawings and pictures.

Additionally as the length of the recording increases it becomes more difficult to edit the audio recording. Even the most talented narrator must go back and do additional takes on portions of the text being recorded. It can be time consuming to locate a specific portion of audio that needs to be redone. In addition to the audio portion the corresponding text must also be located. What initially appears as a straight forward task can quickly turn into a time consuming chore. Once it has been re-recorded the recording or take must be mixed into the master recording. The same problems occur here where the take must be placed in the correct sequential order.

What is needed, therefore, is a method and apparatus that can manipulate the text and audio of a work.

Additionally what is needed is a method and apparatus that can locate portions of a text and then locate the corresponding audio recording.

Further, what is needed is a method and apparatus which allows the narrator or editor to make notes on the text while editing.

BRIEF SUMMARY OF THE INVENTION

The present invention achieves its objections by providing a method and apparatus for recording and editing an audio book which indexes the text and the audio recording such that the a portion of the audio recording can be located and made available for editing. The present invention also allows the integration of images into the text. These images can be included in the completed file for multimedia presentation. Further as the narrator reads the text, the narrator's place in the text is highlighted. During the editing process the file of the original recording is maintained. Any modifications to the original recording are kept in a separate file and then applied when the recording is played back.

The present method and apparatus provide an efficient and user friendly way to record and edit audio books by allowing the narrator or editor to quickly locate a specific portion of a text and the corresponding audio recording.

Further the present invention provides a way to enhance the audio book experience by providing additional information in the form of visual images.

DETAILED DESCRIPTION OF THE PREFERRED EMBODIMENT(S)

The present invention provides several improvements over the prior art and the method of recording, editing and creating an audio book. The method involves using a computer means having a central processing unit running software and having a visual output device, an audio input device, an audio output device and at least one input device. The most common embodiment of this is a personal computer with a monitor, microphone, speakers, keyboard and a mouse running the software of the present invention.

In using the present invention to create an audio book, a narrator reads the text as it is displayed on the screen. The audio performance of the text is then recorded on electronic media. The audio recording and the text are indexed to one another. A specific portion of the text can later be highlighted on the monitor. The software then locates the corresponding index in the audio recording. This identifies the corresponding portion of the audio recording and makes it available for editing.

Similarly, the narrator or another editor can listen to the audio recording. The text is displayed on the monitor as the audio recording is played. The text is highlighted to indicate the position of the audio recording. Such highlights could include but are not limited to changing the color, font, size or other characteristic of the text. Likewise the text could be underlined or the background changed as the words are played in the audio recording.

Indexing of the audio and text can be accomplished by use of a voice recognition software. This can be done at the time of playback or at the time of recording. As the audio is played the computer determines the audio word being played, it then links it back to the same word, sentence or paragraph in the text. This can be done at the time of playback.

If it is done at the time of recording corresponding index marks can be placed in the text and audio recordings. This links one portion of the text to a corresponding portion of the audio recording and vice-versa.

A separate indexing of the audio recording can be done by time stamping the audio recording. This can be used for adaptive level normalization. Normalization is the practice of ensuring the audio output is constant throughout the entire recording or group of recordings. Each take or recording receives a digital time stamp. During normalization breaks in the recording of the performance can be identified and matched automatically to the prevailing sound level/volume. This avoids situations where portions of the audio recording playback louder than others.

Due to indexing it is possible to highlight a portion of the text, the software then locates the corresponding portion of the audio recording and makes it available for editing. The audio file and/or some representation of it can be displayed to the narrator or editor in a separate box on the display.

In the preferred embodiment the original audio file is not directly altered during editing. Instead a file is created containing the modifications to the recording's characteristics. These characteristics could include, but are not limited to, add, delete and modify audio segments as well as adjust tone, base, treble, speed and volume. These changes can then be applied during replay and/or when the portion in question is added to an edited master recording. This allows the narrator and/or editor to compare several different modifications before selecting the final version.

Prior to recording the narrator typically reads through the text making notations as to the interpretation of the text to be used during the reading and recording. These notations could also be entered by an editor. With the present invention, these notations can be made on the computer and indexed to a specific portion of the script. Once entered into the computer the notation can either be displayed in a different color or font on the text. Another option is that the notation is hidden in a cue, such as a small asterisk, carrot or other character, which is displayed on the text. The narrator can then roll the mouse over the top of the character displayed on the monitor which causes the software to display the notation on the screen. When the mouse is rolled away from the character, the notations disappear. These notations can be stored either in the same text file or as separate file that is referenced to various portions of the text file. The reference can be tied to the index.

After an audio file has been edited for correctness an edition or pick-up file is created containing the location and substance of each error. This pick-up file is integrated into the narrators file to highlight the errors. Once corrections are completed, a correction file is created containing the location of the audio correction, the new audio take and the reason for each correction. This correction file is then integrated into the master file.

Images can also be integrated into the text. These can then be output with the audio to produce multimedia files such as Mpeg2 files to produce DVDs, and flash files for web application, or Mpeg4 files for applications such as iPhones. Image files may be maps, photos, diagrams, and the like associated with the book. Likewise the images could be illustrations for comic books or children's books.

Other notations may appear directly in the text providing bold, italics, strike out or underline. These notations can be used in the reading of the text to provide information regarding dramatic interpretation.

The present invention can provide an auto follow along feature. This allows the software and display to follow along the text as the narrator reads it. This can be done in numerous ways including but not limited to changing the color of the text as it is read, changing the background color or otherwise highlighting the text as it is being read or providing underline of the text as it is being read. The software uses voice recognition to identify the words as they are read into the microphone. The software then identifies the portion of the text which most closely matches the text on the voice recognition. The display of the text is then altered to show the highlight within the text.

The present invention also allows the narrator to make multiple takes of the same text. The text in question is highlighted and then displayed on the screen. The narrator reads the text aloud providing the audio portion of the recording. At the completion the audio recording will save to a separate file and the narrator is given the option to re-perform this same text. Once the narrator has made the desired number of takes of that particular text the narrator has the ability to play back the audio portions of those text and select the preferred take which is then kept. If desired, the unselected takes can be retained for the editor to make a final decision as to which take is the preferred.

The present invention can also have the ability to generate and insert intros and outros into the master. Examples include statements such as "beginning of disk three" and "end of disk three" at the beginning and end of a compact disk holding the audio book.

The present invention can also have the ability to compress files for ease of sending them via e-mail. This feature allows the editor or narrator to send the text and/or audio recording of the performance in a compressed file format. These compressed files typically include edited versions of the text and audio. However in some circumstances it may be beneficial to send an unedited version of these files.

The export of a final text can be either with or without the editor and narrator's comments. This export could be the text only or in conjunction with the audio portion. The exported text can be saved in various formats including but not limited to pdf and other popular eBook and digital formats. This alleviates logistics in sending copies of the text and ensures the text can be sent to another individual in a format which they can access.

When exporting a completed file, the present invention can be equipped to include both the text and the audio in a single digital file. In this embodiment the text is displayed as the corresponding audio portion is played.

If a finished audio file is being exported this can be accomplished using audio file formats commonly known in the field. These include but are not limited to MP3, CDA, MP4, WAV, OGG, MPC, FLAC, AIFF, RAW, AU, RA, MIDI, ACC and WMA.

The present invention can also have the ability to accept voice commands. This embodiment allows the editor or narrator to control the function of the system through verbal commands and/or operation of a mouse, keyboard, joystick or the like.

While the present invention has the ability to edit the audio recording in certain basic ways including, add, delete and modify audio segments as well as adjust tempo, overall volume, tone and the like, sometimes it is still necessary to use third party editing software to further refine the audio recording. For this reason the present invention can be equipped to integrate with various third party audio editing software. This allows the editor and narrator to further perfect the audio recording.

The present invention can also be equipped to allow file merging from a plurality of narrators. In this embodiment the audio recording from each narrator is merged into a master recording. Indexing of the audio recording ensures the individual recordings are merged into the correct order and location.

The present invention can also include the ability to synchronize text while importing audio from other sources. The other source could include but are not limited to CDs, DATs, cassettes, and various digital audio files. Here changes to the text in these other sources are added to the text of the master.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A method of producing an audio file, said method comprising:
   providing a computing means having a central processing unit, visual output device, audio input device running software, and at least one manual input device;
   displaying a text on the visual output device to a human narrator;
   creating a performance of the text by the human narrator;
   capturing the performance of the text via the audio input device;
   recording the performance on electronic media;
   altering a portion of the text;

displaying the altered text on the visual output device to the human narrator;
reperforming the altered text;
recording the reperformance of the altered text;
integrating the recording of the reperformance into the recording of the performance;
indexing the recording of the reperformance of the altered text in sequence with a previously recorded performance of a portion of the text; and
controlling the processing of the file via voice commands.

2. The method of claim 1, said manual input device comprising a keyboard.

3. The method of claim 1, said manual input device comprising a mouse.

4. The method of claim 1, further comprising the software adding intros to the recording of the performance.

5. The method of claim 1, further comprising the software adding outros to the recording of the performance.

6. The method of claim 1, further comprising:
highlighting a portion of text on the display;
the software locates a portion of the performance recording that corresponds to the highlighted portion of the text; and
editing the recording of the performance corresponding to the highlighted portion of the text.

7. The method of claim 1, further comprising:
highlighting a portion of the text on the display;
the software locates a portion of the performance recording that corresponds to the highlighted portion of the text; and
the software displays at least one attribute of the audio recording corresponding to the highlighted text.

8. The method of claim 1, further comprising:
recording a timestamp of at least a first and a second performance recording;
identifying a break in a performance between the first and second performance recording based on the timestamp; and
normalizing audio output of the first and second performance recording to a prevailing level.

9. The method of claim 1, further comprising:
highlighting a portion of text on the display;
the software locates a portion of the performance recording that corresponds to the highlighted portion of the text;
entering a modification of at least one attribute of the portion of the performance recording; and
storing the modification in a file separate from the performance recording.

10. The method of claim 9, further comprising:
entering comments to the text;
associating the comments to a portion of the text.

11. The method of claim 10, further comprising:
displaying a cue in the text representing the comments; and
displaying the comments only when the cue is highlighted.

12. The method of claim 1, further comprising:
exporting the finished audio product to a file of the type selected from the group consisting of: MP3, CDA, MP4, windows media, and WMA.

13. The method of claim 1, further comprising:
compressing a file for export and
exporting the file.

14. A method of producing an audio file, said method comprising:
providing a computing means having a central processing unit, visual output device, audio input device running software, and at least one manual input device;
displaying a text on the visual output device to a human narrator;
creating a performance of the text by the human narrator;
capturing the performance of the text via the audio input device;
recording the performance on electronic media;
altering a portion of the text;
displaying the altered text on the visual output device to the human narrator;
creating a reperformance of the altered text by the human narrator;
recording the reperformance of the altered text;
storing the recording of the reperformance in a file separate from an original performance recording;
integrating the recording of the reperformance into the recording of the performance using indexing of the performance and reperformance relative to the text and altered text;
automatically adding an intro and an outro to the output file;
compressing the output file;
exporting the output file; and
controlling the processing of the method via voice commands.

* * * * *